(12) United States Patent
Watanabe et al.

(10) Patent No.: US 10,005,867 B2
(45) Date of Patent: Jun. 26, 2018

(54) MODIFIED POLYVINYL ALCOHOL AND PROCESS FOR PRODUCING THE SAME

(75) Inventors: Satoshi Watanabe, Itoigawa (JP); Hirohisa Otake, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 427 days.

(21) Appl. No.: 11/816,791

(22) PCT Filed: Aug. 29, 2005

(86) PCT No.: PCT/JP2005/015684
§ 371 (c)(1),
(2), (4) Date: Aug. 21, 2007

(87) PCT Pub. No.: WO2006/095462
PCT Pub. Date: Sep. 14, 2006

(65) Prior Publication Data
US 2008/0214764 A1    Sep. 4, 2008

(30) Foreign Application Priority Data

Mar. 8, 2005  (JP) .................. 2005-063395

(51) Int. Cl.
*C08F 222/06* (2006.01)
*C08F 216/06* (2006.01)
(Continued)

(52) U.S. Cl.
CPC ............. *C08F 222/06* (2013.01); *C08F 8/44* (2013.01); *C08F 216/06* (2013.01); *C08F 222/14* (2013.01); *C08F 2810/50* (2013.01)

(58) Field of Classification Search
CPC ........ C08F 8/12; C08F 216/06; C08F 222/14; C08F 2810/50
(Continued)

(56) References Cited

U.S. PATENT DOCUMENTS 2,306,071 A * 12/1942 Van Dyke et al. ............. 525/60
2,480,551 A *  8/1949 Coffman et al. ............... 525/60
(Continued)

FOREIGN PATENT DOCUMENTS

EP    0 589 430 A2    3/1994
EP    1 443 060 A1    8/2004
(Continued)

OTHER PUBLICATIONS

Vinyl Acetate Emulsion Polymerization and Copolymerization With Acrylic Monomers by Yildirim Erbil 2000.*
(Continued)

*Primary Examiner* — Mark S Kaucher
(74) *Attorney, Agent, or Firm* — Oblon, McClelland, Maier & Neustadt, L.L.P.

(57) ABSTRACT

The present invention provides modified PVA having unsaturated double bonds derived from a specific monomer in the main chain of the molecule. A modified polyvinyl alcohol containing bond units of the formula (1) having double bonds in its molecular main chain:

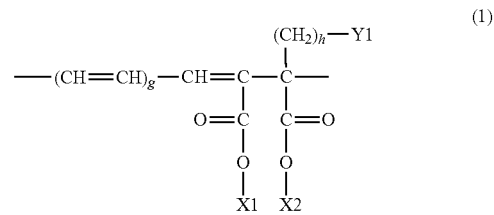

wherein each of X1 and X2 is a $C_{1-12}$ lower alkyl group, a hydrogen atom or a metal atom, g is an integer of from 0 to (Continued)

3, h is an integer of from 0 to 12, Y1 is a hydrogen atom or —COOM, and M is a hydrogen atom, an alkyl group or a metal atom.

14 Claims, 1 Drawing Sheet

(51) Int. Cl.
  *C08F 8/44* (2006.01)
  *C08F 222/14* (2006.01)
(58) Field of Classification Search
  USPC .......................................... 525/56, 59, 61, 62
  See application file for complete search history.

(56) References Cited

U.S. PATENT DOCUMENTS

| | | | | |
|---|---|---|---|---|
| 3,190,843 | A | * | 6/1965 | Zimmermann et al. ...... 521/136 |
| 3,220,991 | A | * | 11/1965 | Martins ........................... 525/61 |
| 3,582,513 | A | * | 6/1971 | Bouchard et al. ............ 524/379 |
| 4,388,442 | A | | 6/1983 | Taniguchi et al. |
| 4,826,917 | A | * | 5/1989 | Kondo et al. ................. 524/459 |

FOREIGN PATENT DOCUMENTS

| | | | | |
|---|---|---|---|---|
| JP | 35 8245 | | 6/1960 | |
| JP | 36 13547 | | 8/1961 | |
| JP | 36 19290 | | 10/1961 | |
| JP | 39-5978 | | 4/1964 | |
| JP | 54135891 | * | 10/1979 | ................ C08F 8/12 |
| JP | 54135891 A | * | 10/1979 | ................ C08F 8/12 |
| JP | 56-55401 | | 5/1981 | |
| JP | 56-93708 | | 7/1981 | |
| JP | 61 108602 | | 5/1986 | |
| JP | 4 283749 | | 10/1992 | |
| JP | 8-208724 | | 8/1996 | |
| JP | 2001 72720 | | 3/2001 | |
| JP | 2002-275214 | | 9/2002 | |
| JP | 2002275214 | * | 9/2002 | ................ C08F 8/12 |
| JP | 2004 250695 | | 9/2004 | |

OTHER PUBLICATIONS

Howard C. Haas, et al., "On the Ultraviolet Absorption Spectrum of Polyvinyl Alcohol", Journal of Polymer Science: Part A, vol. 1, Issue 4, Apr. 1963, pp. 1215-1226.

Japanese Office Action dated Aug. 21, 2012, in Japan Patent Application No. 2007-506983 (with English translation).

* cited by examiner

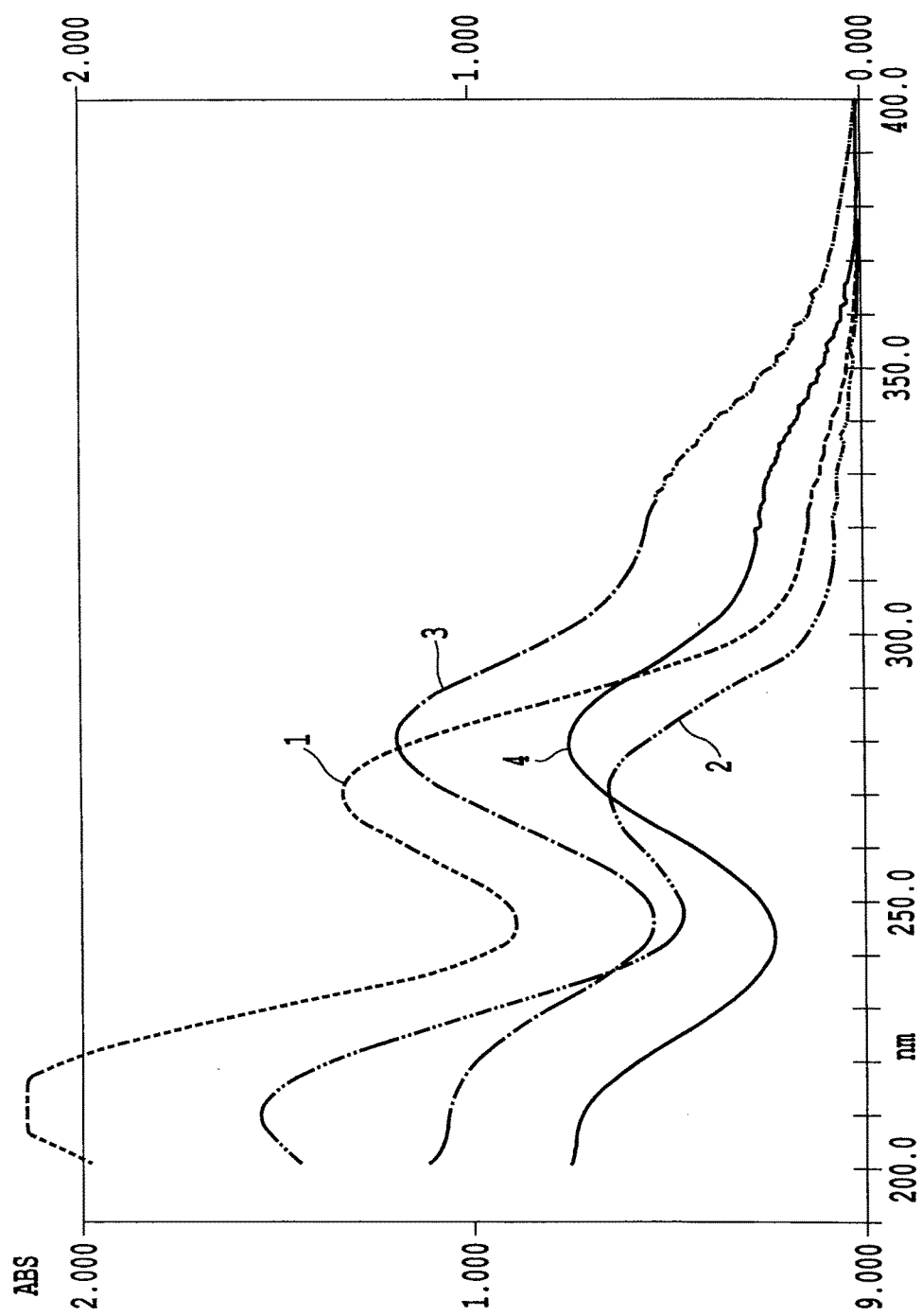

MODIFIED POLYVINYL ALCOHOL AND PROCESS FOR PRODUCING THE SAME

TECHNICAL FIELD

The present invention relates to a modified polyvinyl alcohol having double bonds derived from a specific monomer in its main chain, and a process for its production.

BACKGROUND ART

As a polyvinyl alcohol (hereinafter referred to as PVA) having reactive unsaturated double bonds introduced into its molecule, one obtained by introducing unsaturated double bonds to side chains of PVA by subjecting PVA or modified PVA to post-modification with a reactive molecule containing a polymerizable double bond (e.g. Patent Document 1), one obtained by preparing a polyvinyl ester copolymer having protected ethylenic unsaturated double bonds and then removing the protection (e.g. Patent Document 2) or one having unsaturated double bonds introduced to the molecular terminals of PVA by using an aldehyde as a chain transfer agent (e.g. Patent Document 3) has, for example, been known.

Patent Document 1: JP-A-04-283749
Patent Document 2: JP-A-2001-072720
Patent Document 3: JP-A-2004-250695

DISCLOSURE OF THE INVENTION

Object to be Accomplished by the Invention

It is an object of the present invention to provide a modified PVA having unsaturated double bonds derived from a specific monomer in the main chain of its molecule, and a process for its production.

Means to Accomplish the Object

The present invention is to accomplish the above object via a saponification reaction of a copolymer obtainable by copolymerizing a specific monomer.

Namely, the present invention provides a modified PVA containing bond units of the following formula (1) in its molecular main chain. Such a modified PVA shows an absorbance of preferably at least 0.05, particularly preferably at least 0.10, at 270 nm in the ultraviolet absorption spectrum of its 0.2 mass % aqueous solution, methanol solution or water/methanol mixed solution. Further, the content of an unmodified polyvinyl alcohol is preferably at most 25 mass %, particularly preferably at most 20 mass %.

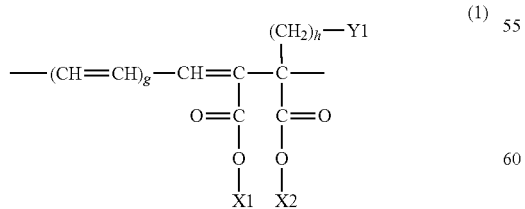

(1)

wherein each of X1 and X2 is a $C_{1-12}$, preferably $C_{1-3}$, lower alkyl group, a hydrogen atom or a metal atom such as sodium or potassium, g is an integer of from 0 to 3, h is an integer of from 0 to 12, preferably from 0 to 3, Y1 is a hydrogen atom or —COOM, and M is a hydrogen atom, an alkyl group or a metal atom such as sodium or potassium.

Effects of the Invention

According to the present invention, it is possible to obtain a novel modified PVA having unsaturated double bonds derived from a specific monomer in the main chain of its molecule, represented by the above formula (1).

BRIEF DESCRIPTION OF DRAWING

FIG. 1 is a graph wherein the ultraviolet absorption spectra of Examples 2 and 4 are compared with the ultraviolet absorption spectra of conventional aldehyde modified PVA.

MEANINGS OF SYMBOLS

1: The ultraviolet absorption spectrum of Example 2
2: The ultraviolet absorption spectrum of Example 4
3: The ultraviolet absorption spectrum of conventional aldehyde modified PVA (L-8, manufactured by Kuraray Co., Ltd.)
4: The ultraviolet absorption spectrum of conventional aldehyde modified-PVA (ALKOTEX 72.5, manufactured by Syntomer Ltd.)

BEST MODE FOR CARRYING OUT THE INVENTION

The modified PVA represented by the above formula (1) of the present invention is one obtainable by copolymerizing a monomer having an ethylenically unsaturated double bond and a monomer having a vinyl ester unit, then saponifying the obtained copolymer to obtain a polyvinyl alcohol containing carbonyl groups, followed by washing and drying, and is one having unsaturated double bonds randomly introduced into the main chain with carboxyl groups being starting points.

As the above monomer having an ethylenically unsaturated double bond, one represented by the formula (3) can be suitably used:

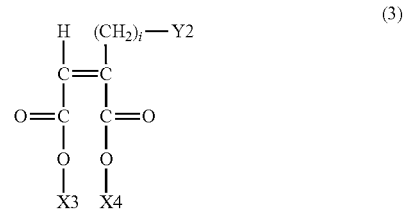

(3)

wherein each of X3 and X4 is a $C_{1-12}$ lower alkyl group, a hydrogen atom or a metal atom, i is an integer of from 0 to 12, Y2 is a hydrogen atom or —COOM, and M is a hydrogen atom, an alkyl group or a metal atom.

Such a monomer may, for example, be dimethyl maleate or diethyl maleate.

Further, a monomer represented by the following formula (4) can be also suitably used:

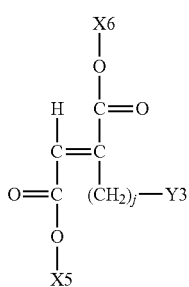

(4)

wherein each of X5 and X6 is a $C_{1-12}$ lower alkyl or a hydrogen atom, j is an integer of from 0 to 12, Y3 is a hydrogen atom or —COOM, and M is a hydrogen atom, an alkyl group or a metal atom.

This monomer may, for example, be dimethyl fumarate, monoethyl fumarate, diethyl fumarate or dimethyl citraconate.

Further, a monomer represented by the following formula (5) can be also suitably used:

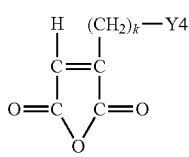

(5)

wherein k is an integer of from 0 to 12, Y4 is a hydrogen atom or —COOM, and M is a hydrogen atom, an alkyl group or a metal atom.

This monomer may, for example, be maleic anhydride or citraconic anhydride.

The content (the copolymerized amount) of the monomer having an ethylenic unsaturated double bond in the modified PVA of the present invention is not particularly limited, but it is preferably from 0.1 to 50 mol %, more preferably from 0.1 to 10 mol %, with a view to securing the amount of the unsaturated double bonds in the molecule and the solubility in water.

On the other hand, the above monomer having a vinyl ester unit is not particularly limited, but it may, for example, be vinyl formate, vinyl acetate, vinyl propionate, vinyl caprylate, vinyl laurate, vinyl stearate, vinyl benzoate, vinyl pivalate or vinyl versatate. Vinyl acetate is preferred from such a viewpoint that the polymerization can be carried out constantly.

Further, when the modified PVA of the present invention is to be obtained, in addition to the above-described monomers, other monomers copolymerizable with such monomers, may further be copolymerized, as the case requires. Such copolymerizable other monomers are not particularly limited. They may, for example, be an olefin such as ethylene, propylene, 1-butene or isobutene; an unsaturated acid such as acrylic acid, methacrylic acid, crotonic acid, phthalic acid, maleic acid or itaconic acid, or salts thereof or a $C_{1-18}$ monoalkyl ester or dialkyl ester thereof; an acrylamide such as acrylamide, a $C_{1-18}$ N-alkyl acrylamide, an N,N-dialkyl acrylamide, diacetone acrylamide, 2-acrylamide propanesulfonic acid or its salt, acrylamide propyldimethylamine or its salt or its quaternary salt; a methacrylamide such as methacrylamide, a $C_{1-18}$ N-alkyl methacrylamide, an N,N-dialkyl methacrylamide, diacetone methacrylamide, 2-methacrylamide propanesulfonic acid or its salt, methacrylamide propyldimethylamine or its salt or its quaternary salt; a vinyl ether such as an alkyl vinyl ether having a $C_{1-18}$ alkyl chain length, a hydroxyalkyl vinyl ether or an alkoxyalkyl vinyl ether; an N-vinylamide such as N-vinylpyrrolidone, N-vinylformamide or N-vinylacetamide; a vinyl cyanate such as acrylonitrile or methacrylonitrile; a vinyl halide such as vinyl chloride, vinylidene chloride, vinyl fluoride, vinylidene fluoride, vinyl bromide or vinylidene bromide; a vinyl silane such as trimethoxy vinyl silane; an allyl compound such as allyl acetate, allyl chloride, allyl alcohol or dimethylallyl alcohol; a vinylsilyl compound such as vinyl trimethoxysilane; and isopropenyl acetate. The amount of such copolymerizable monomers to be used is not particularly limited, but it is preferably from 0.001 to 20 mol % based on the total monomers to be used.

The number average molecular weight (hereinafter abbreviated as Mn) of the modified PVA is not particularly limited, but it is preferably within a range of from 1,900 to 66,500, which is commonly employed. Particularly, with a view to improving the balance of the solubility in water and the protective colloidal nature, it is more preferably within a range of from 3,800 to 28,500.

The method for polymerization of the monomer to obtain the modified PVA of the present invention is not particularly limited, and a known polymerization method may be used. Usually, solution polymerization is carried out wherein an alcohol such as methanol, ethanol or isopropyl alcohol is used as the solvent. Bulk polymerization, emulsion polymerization or suspension polymerization may also be carried out. Such solution polymerization may be continuous polymerization or batch polymerization, and the monomer may be charged in a divided fashion or all at once, or any optional means may be employed such as adding continuously or intermittently.

The polymerization initiator to be used in the solution polymerization is not particularly limited, but it may, for example, be an azo compound such as azobisisobutyronitrile, azobis-2,4-dimethylvaleronitrile or azobis(4-methoxy-2,4-dimethylvaleronitrile); a peroxide such as acetyl peroxide, benzoyl peroxide, lauroyl peroxide, acetylcyclohexylsulfonyl peroxide or 2,4,4-trimethylpentyl-2-peroxyphenoxy acetate; a percarbonate compound such as diisopropyl peroxydicarbonate, di-2-ethylhexyl peroxydicarbonate or diethoxyethyl peroxydicarbonate; a perester compound such as t-butyl peroxyneodecanate, α-cumyl peroxyneodecanate or t-butyl peroxyneodecanate; or a known radical polymerization initiator such as azobisdimethylvaleronitrile or azobismethoxyvaleronitrile. The polymerization reaction temperature is selected usually within a range of from about 30° C. to 90° C.

The saponification is one wherein the copolymer obtained by copolymerizing the monomers, is dissolved in an alcohol, and the ester in the molecule is hydrolyzed in the presence of an alkali catalyst or an acid catalyst. As the alcohol, methanol, ethanol or butanol may, for example, be used. The concentration of the copolymer in the alcohol is not particularly limited, but it is usually selected within a range of from 10 to 80 wt %. As the alkali catalyst, an alkali catalyst such as an alkali metal hydroxide or alcoholate, such as sodium hydroxide, potassium hydroxide, sodium methylate, sodium ethylate or potassium methylate, may, for example, be used. As the acid catalyst, an aqueous solution of an inorganic acid such as hydrochloric acid or sulfuric acid, or an organic acid such as p-toluenesulfonic acid, may be used. The amount of such a catalyst is preferably from 1 to 100 mmol equivalent to the copolymer. The saponification temperature is not particularly limited, but it is usually within a range of from 10 to 70° C., preferably from 30 to 40° C. The reaction time is not particularly limited, but it is usually from 30 minutes to 3 hours.

The absorbance of the modified polyvinyl alcohol is not particularly limited, but the absorbance at 270 nm in the ultraviolet absorption spectrum of its 0.2 mass % aqueous solution, methanol solution or water/methanol mixed solution, is preferably at least 0.05, particularly preferably at least 0.10. This absorbance can be adjusted to an optional value by changing the amount of the catalyst to be used in the saponification step, the saponification time or the saponification temperature.

Here, with respect to the attribution of the ultraviolet absorption spectrum, JP-A-2004-250695, etc. disclose that the absorption at 215 nm belongs to the structure of —CO—CH=CH— in the PVA resin, the absorption at 280 nm belongs to the structure of —CO—(CH=CH)$_2$— in the PVA resin, and the absorption at 320 nm belongs to the structure of —CO—(CH=CH)$_3$— in the PVA resin.

The ultraviolet absorption spectrum attributable to the double chain structure of an unsaturated double bond (—CO—(CH=CH)$_2$—) in common PVA wherein an aldehyde is used as a chain transfer agent, shows a peak top in the vicinity of 280 nm. Whereas, the modified PVA of the present invention is one having a peak which is attributable to the structure of the following formula (2) and which is contained within a range of from 265 to 275 nm with 270 nm at the center. A comparative chart is shown in FIG. 1.

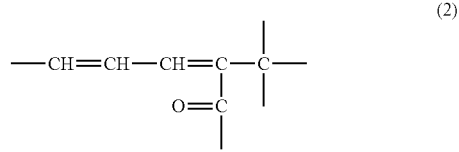

(2)

The saponification degree of the modified polyvinyl alcohol of the present invention is not particularly limited, but it is preferably from 30 to 99.9 mol %, particularly preferably from 40.0 to 99.0 mol %, from such a viewpoint that sufficient unsaturated double bonds are thereby be formed.

EXAMPLES

Now, the present invention will be described in further detail with reference to Examples. Here, unless otherwise specified, "parts" and "%" mean "parts by mass" and "mass %".

Example 1

Production of Modified PVA

17 Parts of vinyl acetate, 14 parts of methanol, 0.023 part of dimethyl maleate and azobisisobutyronitrile in an amount of 0.10% to vinyl acetate, were charged into a polymerizer. After flushing with nitrogen, the mixture was heated to the boiling point, and a mixed solution comprising 6 parts of vinyl acetate, 5 parts of methanol and 0.207 part of dimethyl maleate was further continuously added and polymerized until the conversion reached 75%. When the conversion reached 90%, the polymerization was terminated. Then, non-polymerized vinyl acetate was removed by a usual method, and the obtained polymer was saponified with sodium hydroxide by a usual method. Then, the product was subjected to hot-air drying at 90° C. for 90 minutes to obtain a modified polyvinyl alcohol having a molecular weight (Mn) of 11,000, a saponification degree of 88.0 mol %, a dimethyl maleate content of 0.6 mol %, an absorbance at a wavelength of 270 nm of its 0.2% aqueous solution being 0.9 and an unmodified PVA content of 13%.

Analytical Methods

The saponification degree of the modified PVA was measured in accordance with JIS K6276 "3.5 Saponification Degree". With respect to the molecular weight of the modified PVA, an aqueous solution having a sample concentration of 0.25 w/v % was measured at 40° C. by means of GPC, and Mn was calculated as standard polyethylene glycol. With respect to the content of unmodified PVA, the modified PVA was completely saponified by an alkali catalyst in methanol and subjected to soxhlet extraction to obtain a sample, which was adjusted to an aqueous solution having a concentration of 0.01 w/v %, whereupon using ion-exclusion HPLC, the content of unmodified PVA was calculated as an area ratio of the IR detector. With respect to the 270 nm absorbance, the modified PVA was adjusted to a 0.2 mass % aqueous solution, and the absorbance of ultraviolet ray of 270 nm was measured.

Photo-Curing Property

5 Parts of the modified PVA was dissolved in 45 parts of water to prepare an about 10% aqueous solution. To this aqueous solution, 0.005 part of a photopolymerization initiator (IRGACURE 2959, manufactured by NAGASE CO., LTD.) was added, and UV irradiation was carried out.

Emulsion Polymerization of Acryl Monomer

Into a polymerizer made of glass and equipped with a reflux condenser, a dropping funnel, a thermometer and a nitrogen inlet, 4,550 parts of deionized water was added, and 40 parts of PVA was added and dissolved with stirring under heating. Then, the interior temperature of the polymerizer was adjusted to 70° C., and as a polymerization initiator, 2 parts of ammonium persulfate, 23 parts of methyl methacrylate and 23 parts of 2-ethylhexyl acrylate were added, followed by polymerization for 30 minutes. Then, the internal temperature of the polymerizer was raised to 80° C., and 207 parts of methyl methacrylate and 207 parts of 2-ethylhexyl acrylate were continuously added over a period of 3 hours. After completion of the continuous addition, 0.05 g of ammonium persulfate was additionally added to carry out an aging reaction for 1 hour to complete the polymerization. The physical properties of the obtained acrylic resin emulsion were measured in accordance with the following methods.

Average Particle Size of Emulsion

Using a laser diffraction particle size distribution meter "SALD 3000" (manufactured by Shimadzu Corporation), after irradiation with ultrasonic waves for 5 minutes, the measurement was carried out.

Viscosity of Emulsion

The emulsion was adjusted to 30° C., and then the viscosity was measured at 4 rpm by using a BH type viscometer (rotor No. 6 or 7).

Examples 2 to 6 and Comparative Examples 1 to 3

A modified PA was prepared in the same manner as in Example 1 except that the saponification degree, the molecular weight (Mn), the type of the monomer having an ethylenic unsaturated double bond, the modification degree, the amount of PVA added at the time of the emulsion polymerization of the acryl monomer, were changed, respectively, as shown in Table 1, and the evaluation was carried out in the same manner as in Example 1.

TABLE 1

| | | Example | | | | | |
|---|---|---|---|---|---|---|---|
| | | 1 | 2 | 3 | 4 | 5 | 6 |
| Production of PVA | Type of monomer having ethylenic unsaturated double bond | Dimethyl maleate | Dimethyl maleate | Dimethyl maleate | Maleic anhydride | Dimethyl maleate | Dimethyl maleate |
| | Charged amount of monomer having ethylenic unsaturated double bond (mol) | 0.6 | 1.0 | 5.0 | 1.0 | 1.0 | 0.2 |
| | Saponification degree (mol %) | 88.0 | 71.0 | 71.0 | 72.0 | 88.0 | 88.0 |
| | 270 nm absorbance | 0.9 | 1.1 | 4.4 | 0.4 | 1.0 | 0.2 |
| | Molecular weight (Mn) | 11,000 | 21,700 | 11,000 | 21,000 | 16,600 | 10,000 |
| | Amount of unmodified PVA (%) | 13 | 17 | 10 | 15 | 25 | 45 |
| Physical properties of aqueous solution | Photocuring property | Viscosity increased | Viscosity increased | Gelled | Viscosity increased | Viscosity increased | Viscosity increased |
| Emulsion polymerization of acryl monomer | Amount of PVA added (parts) | 40 | 40 | 20 | 40 | 40 | 40 |
| Physical properties of polymer | Average particle size of emulsion (μm) | 2.0 | 4.0 | 3.0 | 1.6 | 5.0 | 1.4 |
| | Viscosity of emulsion (mPa·s) | 90,000 | 40,000 | 50,000 | 80,000 | 50,000 | 160,000 |

| | | Comparative Example | | |
|---|---|---|---|---|
| | | 1 | 2 | 3 |
| Production of PVA | Type of monomer having ethylenic unsaturated double bond | Nil | Nil | Nil |
| | Charged amount of monomer having ethylenic unsaturated double bond (mol) | 0.0 | 0.0 | 0.0 |
| | Saponification degree (mol %) | 72.0 | 88.0 | 88.0 |
| | 270 nm absorbance | 0.0 | 0.0 | 0.0 |
| | Molecular weight (Mn) | 10,500 | 34,000 | 10,600 |
| | Amount of unmodified PVA (%) | 85 | 80 | 90 |
| Physical properties of aqueous solution | Photocuring property | Uncured | Uncured | Uncured |
| Emulsion polymerization of acryl monomer | Amount of PVA added (parts) | 40 | 40 | 40 |
| Physical properties of polymer | Average particle size of emulsion (μm) | 1.1 | 1.0 | 1.1 |
| | Viscosity of emulsion (mPa·s) | 200,000 | Gelled | 250,000 |

INDUSTRIAL APPLICABILITY

The modified PVA of the present invention can be easily cured by energy rays such as ultraviolet rays or electron rays, if necessary, in combination with e.g. a photoinitiator or a polymerizable monomer. The modified PVA of the present invention is effectively useful for a coating material, an ink, an adhesive, a printing plate, an etching resist, a solder resist, a dispersant for suspension polymerization, a protective colloid agent for emulsion polymerization of vinyl acetate, a protective colloid agent for polymerization of an acrylic emulsion, or a protective colloid agent for polymerization of a styrene emulsion.

The entire disclosure of Japanese Patent Application No. 2005-063395 filed on Mar. 8, 2005 including specification, claims, drawings and summary is incorporated herein by reference in its entirety.

The invention claimed is:

1. A modified polyvinyl alcohol containing bond units of formula (1) in its molecular main chain:

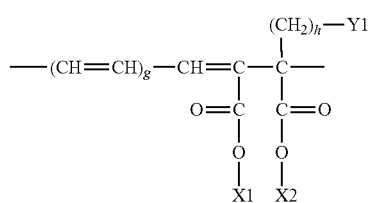

wherein each of X1 and X2 is a methyl group, g is an integer of from 0 to 3, h is 0, Y1 is a hydrogen atom; and 0 to 20 mol % of copolymerizable monomers
obtained by copolymerizing at least one monomer having an ethylenically unsaturated double bond of formula (3) and a monomer having a vinyl ester unit by solution polymerization in methanol and saponifying an obtained copolymer

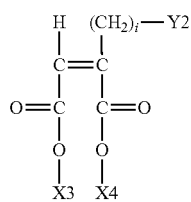

wherein each of X3 and X4 is a methyl group i is 0, Y2 is a hydrogen atom
wherein said monomer having an ethylenically unsaturated double bond and said monomer having a vinyl ester unit are continuously added to a polymerizer and
wherein said modified polyvinyl alcohol has a saponification degree of from 30 to 99.9 mol % and does not contain units from polymerization of any of itaconic acid, maleic acid and maleic anhydride.

2. The modified polyvinyl alcohol according to claim 1, which shows an absorbance of at least 0.05 at 270 nm in the ultraviolet absorption spectrum of its 0.2 mass % aqueous solution, methanol solution or water/methanol mixed solution.

3. The modified polyvinyl alcohol according to claim 1, which shows a peak top at 265 to 275 nm in the ultraviolet absorption spectrum attributable to a structure of formula (2):

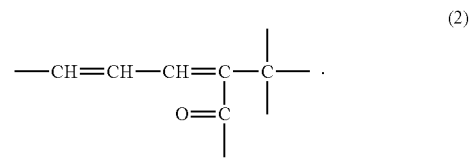

4. The modified polyvinyl alcohol according to claim 1, wherein the content of unmodified polyvinyl alcohol residues is at most 25 mass %.

5. A process for producing the modified polyvinyl alcohol as defined in claim 1, which comprises copolymerizing at least one monomer of formula (3), a monomer having a vinyl ester unit; and 0 to 20 mol % of copolymerizable monomers, and then saponifying the obtained copolymer:

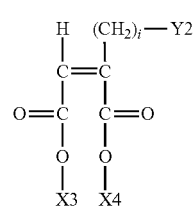

wherein each of X3 and X4 is a methyl group i is 0, Y2 is a hydrogen atom.

6. The process for producing the modified polyvinyl alcohol according to claim 5, which comprises copolymerizing, in addition to said at least one monomer of formula (3) and said monomer having a vinyl ester unit, other monomers copolymerizable with these monomers, and then saponifying the obtained copolymer.

7. The modified polyvinyl alcohol according to claim 1, wherein a content of monomer having an ethylenically unsaturated double bond in the modified polyvinyl alcohol is from 0.1 to 50 mol %.

8. The modified polyvinyl alcohol according to claim 1, wherein a content of monomer having an ethylenically unsaturated double bond in the modified-polyvinyl alcohol is from 0.1 to 10 mol %.

9. The modified polyvinyl alcohol according to claim 1, having a number average molecular weight of from 1,900 to 66,500.

10. The modified polyvinyl alcohol according to claim 1, having a number average molecular weight of from 3,800 to 28,500.

11. The modified polyvinyl alcohol according to claim 1, wherein a 0.2 mass % aqueous, methanol or aqueous methanol solution of said modified polyvinyl alcohol has an absorbance at 270 nm of at least 0.05.

12. The modified polyvinyl alcohol according to claim 1, wherein a 0.2 mass % aqueous, methanol or aqueous methanol solution of said modified polyvinyl alcohol has an absorbance at 270 nm of at least 0.10.

13. The modified polyvinyl alcohol according to claim 1, obtained by copolymerizing at least one monomer having an ethylenically unsaturated double bond of formulae (3) and a monomer having a vinyl ester unit.

14. The modified polyvinyl alcohol according to claim 13, wherein the at least one monomer having an ethylenically unsaturated double bond of formulae (3) is dimethyl maleate.

* * * * *